US006574624B1

(12) United States Patent
Johnson et al.

(10) Patent No.: US 6,574,624 B1
(45) Date of Patent: Jun. 3, 2003

(54) AUTOMATIC TOPIC IDENTIFICATION AND SWITCH FOR NATURAL LANGUAGE SEARCH OF TEXTUAL DOCUMENT COLLECTIONS

(75) Inventors: David E. Johnson, Cortlandt Manor, NY (US); Frank J. Oles, Peekskill, NY (US)

(73) Assignee: International Business Machines Corporation, Armonk, NY (US)

( * ) Notice: Subject to any disclaimer, the term of this patent is extended or adjusted under 35 U.S.C. 154(b) by 255 days.

(21) Appl. No.: 09/640,774

(22) Filed: Aug. 18, 2000

(51) Int. Cl.⁷ .............................................. G06F 17/30
(52) U.S. Cl. .................... 707/5; 707/1; 707/3
(58) Field of Search ............... 707/1–10, 100, 707/104.1

(56) References Cited

U.S. PATENT DOCUMENTS

| | | | | |
|---|---|---|---|---|
| 5,515,488 A | * | 5/1996 | Hoppe et al. | 345/440 |
| 5,911,138 A | * | 6/1999 | Li et al. | 345/764 |
| 6,298,343 B1 | * | 10/2001 | Chang et al. | 707/4 |
| 6,363,377 B1 | * | 3/2002 | Kravets et al. | 707/4 |

* cited by examiner

*Primary Examiner*—Kim Vu
*Assistant Examiner*—Joon Hwan Hwang
(74) *Attorney, Agent, or Firm*—Whitham, Curtis & Christofferson, P.C.; Stephen C. Kaufman

(57) ABSTRACT

A method for iteratively drilling-down on a user's textual free-form natural language query uses a session history to interpret successive queries in the context of previous queries on a topic or topics and to detect an implicit switch in topic. By maintaining a session history of the user's free-form natural language input and by automatically determining whether there is a topic or context switch, the search process is substantially simplified and is more effective; that is, more accurate answers to a user's queries are found faster. In addition, as the system operates on free-form natural language input, automatically constructing the actual search expressions, the complexity of constructing successive search expressions is obviated. If the system determines the user is, according to its session history and tests, asking successive questions within a given topic or context, the system keeps searching within a previously determined given set of previous responses on that context or topic. This effectively narrows the documents found allowing the user to quickly and accurately find just the documents of interest. If the system determines the user has implicitly changed context or topic, based on its session history and tests, it searches all the information at its disposal; i.e., all of the collections of documents.

11 Claims, 2 Drawing Sheets

AUTOMATIC TOPIC IDENTIFICATION AND SWITCH FOR NATURAL LANGUAGE SEARCH OF TEXTUAL DOCUMENT COLLECTIONS

CROSS-REFERENCE TO RELATED APPLICATION

This application is related in subject matter to co-pending U.S. patent application Ser. No. 09/570,788 filed May 15, 2000, by Thilo W. Goetz et al. for "Interactive Automated Response System" and assigned to the assignee of this application. The disclosure of application Ser. No. 09/570,788 is incorporated herein by reference.

BACKGROUND OF THE INVENTION

1. Field of the Invention

The present invention generally relates to a method of determining whether a user is continuing a topic or switching to another topic within a search and, more particularly, to restricting the search to the previous results if the user is continuing a topic, and to searching an entire database if the user is switching topics.

2. Background Description

State of the art search engines have no notion of session history or dialog context. Prior art methods thus often return a great number of responses, and a user cannot easily determine if the desired answer is among them. Narrowing the search on a returned results set typically requires explicitly and manually adding to a previously defined search expression via a Boolean AND function or some other formal expression. If a user wants to initiate a new search outside a previous results set, he or she must take an explicit action. Some systems return results and place them in folders (i.e., categories), which the user can manually inspect and select such that a follow-on search is restricted to a particular folder or category. However, here too the user must manually indicate whether or not he or she is continuing a topic or switching topics. These modes of search are laborious, requiring that the user make many decisions and take many actions.

SUMMARY OF THE INVENTION

It is therefore an object of the invention to provide a method for iteratively drilling-down on a user's textual free-form natural language query using a session history to interpret successive queries in the context of previous queries on a topic or topics.

It is another object of the invention to provide a method for recognizing from a user's current free-form natural language query and a session history of previous queries by the user an implicit switch in topic.

According to the invention, by maintaining a session history of the user's free-form natural language input and by automatically determining whether there is a topic or context switch, the search process is substantially simplified and is more effective; that is, more accurate answers to a user's queries are found faster. In addition, as the present invention operates on free-form natural language input, automatically constructing the actual search expressions, the complexity of constructing successive search expressions is obviated.

If the system determines the user is, according to its session history and tests, asking successive questions within a given topic or context, the system keeps searching within a previously determined given set of previous responses on that context or topic. This effectively narrows the documents found allowing the user to quickly and accurately find just the documents of interest. If the system determines the user has implicitly changed context or topic, based on its session history and tests, it searches all the information at its disposal; i.e., all of the collections of documents.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
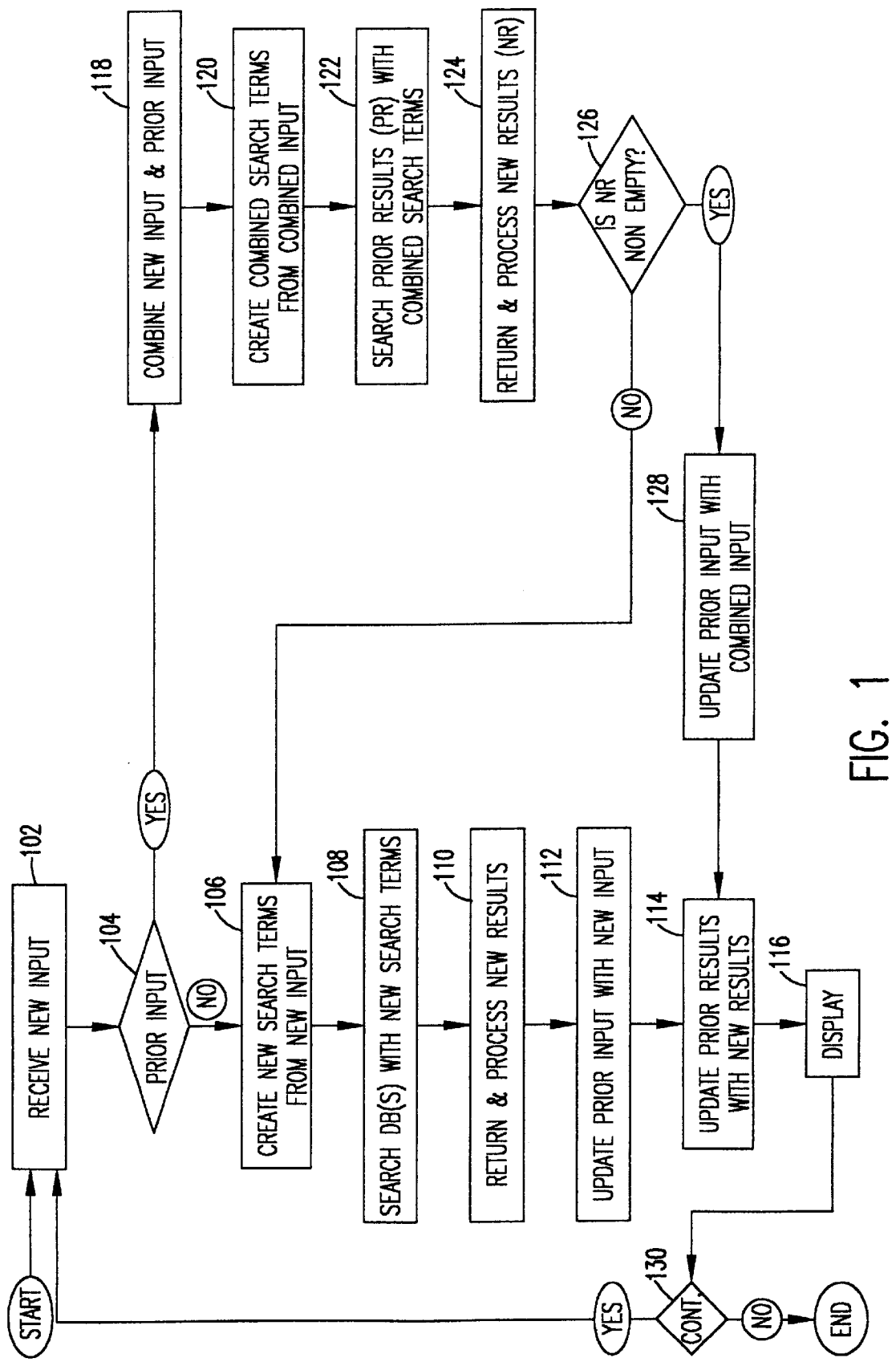
FIG. 1 is a flowchart illustrating the logic of the process implemented according to a first embodiment of the invention.

Referring now to the drawings, and specifically to FIG. 1, user input query in the form of free-form natural language text is received at input block 102. The user query may be either typed in on a keyboard or spoken into a microphone. In the case of spoken input, the system receiving the user query would include a speech recognition system, such as IBM's ViaVoice system, to produce an electronic text document that is processed by the system. In decision block 104, a determination is made whether or not there has been prior input (i.e., is the input query provided in block 102 the first input query, or a second or subsequent input query?). If there has been prior input query, the new input query is combined with previous input query(ies) from the session history maintained by the system, as described in more detail below.

Assuming that this is the first input query, new search terms are created in function block 106 based only on the free-form natural language input. This is done using a parser to identify relevant textual words, which words are used create the search terms. Using these new search terms, one or more databases of the system are searched in function block 108, and the results of the search are returned in function block 110. The prior input is updated with the new input in function block 112, and in function block 114, the prior results are updated with the new results. The results of updated results from function block 114 are then displayed in function block 116.

If there has been a prior input query as determined in decision block 104, the new input query is combined with prior input queries stored in a session history in function block 118. Based on this combined input, combined search terms are created in function block 120. In function block 122, the prior results (PR) are searched utilizing the combined search terms from created in function block 120. The results of the search are returned in function block 124, and the new results (NR) are processed. Note that NR is always a subset of PR. Whenever NR is nonempty, the user is drilling down. However, when NR is empty, it means the search terms contributed by the new input do not apply to any of the prior results, and so a context switch has taken place. A determination is made in decision block 126 as to whether there has been a context switch by testing if NR is nonempty. If the new results are not within the categories of the previous responses, the system detects a context switch in the user's input query, and the process goes to function block 106 where new search terms are created just as if this were a first input query. However, if the new results are within the categories of the previous responses, the prior input is updated with the combined input in the session history in function block 128 before the process goes to function block 114 where the prior results are updated with the new results.

In either case, when the search results are displayed in function block 116, the user is prompted to either provide an additional input query or to indicate whether the search is completed. A determination is made in decision block 130 based on the user's input as to whether the search is to be continued. If so, the process returns to function block 102 to receive the user's next input query; otherwise, the process terminates.

Figure 2:
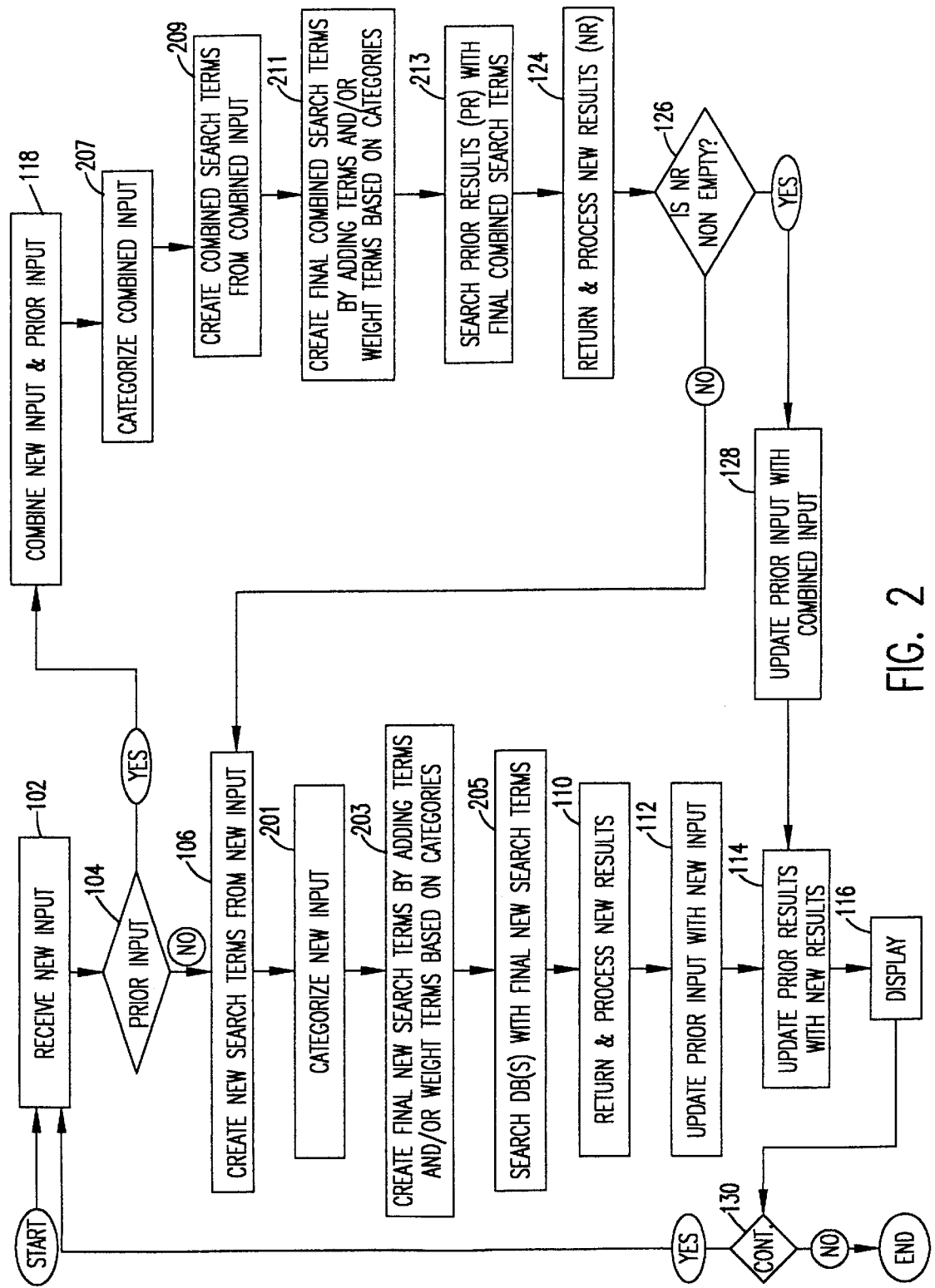
FIG. 2 is a flowchart illustrating the logic of the process implemented according to a second embodiment of the invention.

FIG. 2 shows a refinement of the process of FIG. 1. In this flow diagram, the same reference numerals as used in FIG. 1 are used to designated identical or equivalent steps. Function block 108 of FIG. 1 is replaced by new function blocks 201, 203 and 205. Thus, when new search terms are created in function block 106 using a parser, the next step in function block 201 is to categorize the new input. Then in function block 203, final new search terms are created by adding terms and/or weight terms based on the assigned categories. Using the final new search terms, the system data bases are searched in function block 205.

For the case where the user input query is not the user's first query, function blocks 120 and 122 of FIG. 1 are replaced with new function blocks 207, 209, 211, and 213. After the combined input has been created in function block 118, the combined input is categorized in function block 207. Combined search terms are created from the combined input in function block 209. Then final combined search terms are created in function block 211 by adding terms and/or weight terms based on categories. Using these final combined search terms, the prior results are searched in function block 213.

The advantage of the refinements of this second embodiments in which the user's inputs are categorized and final search terms are created by adding terms and/or weight terms based on the assigned categories is to further improve the accuracy and efficiency of the process.

While the invention has been described in terms of preferred embodiments, those skilled in the art will recognize that the invention can be practiced with modification within the spirit and scope of the appended claims.

Having thus described our invention, what we claim as new and desire to secure by Letters Patent is as follows:

1. A method for automatic topic identification and switch for natural language search of textual document collections comprising the steps of:

receiving a user's textual free-form natural language input query;

maintaining a session history of previous input queries by the user;

interpreting the user's input query in the context of the session history by the further steps of:

combining said input query with said previous input queries to create combined input;

creating combined search terms from the combined input;

using the combined search terms to search prior results (PR) and return new results (NR); and detecting an implicit change in topic based on the session history, said prior results (PR) and said new results (NR) in response to said input query, wherein the step of detecting an implicit change in topic is performed by determining if the set of new search results (NR) based on the combined search terms is empty; and iteratively drilling-down on successive queries in the context of previous queries on a topic by searching within a previously determined set of previous responses to narrow the documents within the search if there is no implicit change in topic.

2. The method for automatic topic identification and switch for natural language search of textual document collections recited in claim 1, further comprising the steps of:

determining if there was a prior user input upon receiving the user's textual free-form natural language input query;

if not, creating new search terms from the user's textual free-form natural language input query.

3. The method for automatic topic identification and switch for natural language search of textual document collections recited in claim 2, wherein said interpreting step further comprises the steps of:

categorizing the user's textual free-form natural language input query;

creating final new search terms by adding terms and/or weight terms based on categories;

categorizing the combined user's textual free-form natural language input query with prior user input from the session history; and creating final combined search terms by adding terms and/or weight terms based on categories.

4. The method for automatic topic identification and switch for natural language search of textual document collections recited in claim 3, further comprising the steps of:

searching a textual document collection with the new search terms;

returning and processing new search results based on the new search terms; and updating the session history with the new search results based on the new search terms.

5. The method for automatic topic identification and switch for natural language search of textual document collections recited in claim 4, wherein said interpreting step further comprises the steps of:

searching prior results with combined search terms;

returning and processing new search results based on the combined search terms; and if an implicit change in topic is not detected, updating the session history with the new search results based on the combined search terms.

6. The method for automatic topic identification and switch for natural language search of textual document collections recited in claim 5, further comprising the steps of:

creating new search terms from the user's textual free-form natural language input query;

searching a textual document collection with the new search terms;

returning and processing new search results based on the new search terms; and updating the session history with the new search results based on the new search terms.

7. The method for automatic topic identification and switch for natural language search of textual document collections recited in claim 6, further comprising the step of displaying the new search results.

8. The method for automatic topic identification and switch for natural language search of textual document collections recited in claim 2, further comprising the steps of:

searching a textual document collection with the new search terms;

returning and processing new search results based on the new search terms; and updating the session history with the new search results based on the new search terms.

9. The method for automatic topic identification and switch for natural language search of textual document collections recited in claim 8, wherein said interpreting step further comprises the steps of:

searching prior results with combined search terms;

returning and processing new search results based on the combined search terms; and if an implicit change in topic is not detected, updating the session history with the new search results based on the combined search terms.

10. The method for automatic topic identification and switch for natural language search of textual document collections recited in claim 9, further comprising the steps of:

creating new search terms from the user's textual free-form natural language input query;

searching a textual document collection with the new search terms;

returning and processing new search results based on the new search terms; and updating the session history with the new search results based on the new search terms.

11. The method for automatic topic identification and switch for natural language search of textual document collections recited in claim 10, further comprising the step of displaying the new search results.

* * * * *